(12) United States Patent
Li (10) Patent No.: US 8,038,954 B2
(45) Date of Patent: Oct. 18, 2011

(54) CSF WITH LOW PLATINUM/PALLADIUM RATIOS

(75) Inventor: Yuejin Li, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 682 days.

(21) Appl. No.: 12/031,063

(22) Filed: Feb. 14, 2008

(65) Prior Publication Data
US 2009/0208394 A1 Aug. 20, 2009

(51) Int. Cl.
*B01D 50/00* (2006.01)
*B01J 23/00* (2006.01)
*B01J 21/00* (2006.01)
*B01J 20/00* (2006.01)

(52) U.S. Cl. ............ 422/180; 422/177; 502/66; 502/74; 502/87; 502/261; 502/262; 502/304; 502/327; 502/332; 502/333; 502/334; 502/339; 502/349; 502/350; 502/351; 502/355; 502/415; 502/439; 502/527.18; 502/527.19

(58) Field of Classification Search .................. 502/326, 502/327, 332, 333, 334, 339, 355, 415, 439, 502/527.12, 527.13, 527.19, 66, 74, 87, 261, 502/262, 304, 349, 350, 351, 527.18; 422/177, 422/180
See application file for complete search history.

(56) References Cited

U.S. PATENT DOCUMENTS

| | | | |
|---|---|---|---|
| 4,134,860 A | 1/1979 | Hindin et al. | |
| 4,335,023 A | 6/1982 | Dettling et al. | |
| 4,585,752 A * | 4/1986 | Ernest | 502/304 |
| 4,714,694 A | 12/1987 | Wan et al. | |
| 4,727,052 A | 2/1988 | Wan et al. | |
| 4,868,148 A | 9/1989 | Henk et al. | |
| 5,010,051 A | 4/1991 | Rudy | |
| 5,057,483 A | 10/1991 | Wan | |
| 5,063,192 A | 11/1991 | Murakami et al. | |
| 5,212,142 A | 5/1993 | Dettling | |
| 5,462,907 A | 10/1995 | Farrauto et al. | |
| 5,597,771 A | 1/1997 | Hu et al. | |
| 5,605,553 A * | 2/1997 | Connolly et al. | 55/487 |
| 5,627,124 A | 5/1997 | Farrauto et al. | |
| 5,888,464 A | 3/1999 | Wu et al. | |
| 5,898,014 A | 4/1999 | Wu et al. | |

(Continued)

FOREIGN PATENT DOCUMENTS

EP 0992276 12/2000

(Continued)

OTHER PUBLICATIONS

Yim, Sung D., et al., "Decomposition of Urea into NH3 for the SCR Process", *Ind. Eng. Chem Res.*, 43, (2004),4856-4863.

(Continued)

*Primary Examiner* — Cam N. Nguyen
(74) *Attorney, Agent, or Firm* — Jeffrey I. Blankman; Diehl Servilla LLC; Melanie L. Brown (57) ABSTRACT

An emission treatment system including a catalyzed soot filter comprising a wall flow monolith and a catalyst comprising at least two types of support particles is described. The first support particle contains at least a platinum component, the second support particles contains at least a palladium component. The wall flow monolith may be washcoated with a slurry comprising at least two types of particles without applying a passivation layer to the wall flow monolith.

14 Claims, 5 Drawing Sheets

U.S. PATENT DOCUMENTS

| | | | |
|---|---|---|---|
| 5,902,363 A * | 5/1999 | Connolly et al. | 55/487 |
| 5,948,723 A | 9/1999 | Sung | |
| 5,992,142 A | 11/1999 | Pott | |
| 6,044,644 A | 4/2000 | Hu et al. | |
| 6,051,040 A | 4/2000 | Peter-Hoblyn | |
| 6,087,298 A | 7/2000 | Sung et al. | |
| 6,248,688 B1 | 6/2001 | Wu et al. | |
| 6,342,192 B1 * | 1/2002 | Andersson et al. | 423/213.5 |
| 6,613,299 B2 * | 9/2003 | Dang et al. | 423/239.1 |
| 6,680,037 B1 | 1/2004 | Allansson et al. | |
| 6,718,757 B2 | 4/2004 | Khair et al. | |
| 6,753,294 B1 * | 6/2004 | Brisley et al. | 502/439 |
| 6,764,665 B2 * | 7/2004 | Deeba et al. | 423/239.1 |
| 6,805,849 B1 | 10/2004 | Andreasson et al. | |
| 6,826,906 B2 | 12/2004 | Kakwani et al. | |
| 6,892,529 B2 | 5/2005 | Duvinage et al. | |
| 6,928,806 B2 | 8/2005 | Tennison et al. | |
| 6,935,103 B2 | 8/2005 | Binder et al. | |
| 6,996,975 B2 | 2/2006 | Radhamohan et al. | |
| 7,040,084 B2 | 5/2006 | Ament | |
| 7,062,904 B1 | 6/2006 | Hu et al. | |
| 7,093,428 B2 * | 8/2006 | LaBarge et al. | 60/286 |
| 7,097,817 B2 * | 8/2006 | Brisley et al. | 423/245.3 |
| 7,143,578 B2 | 12/2006 | Kakwani et al. | |
| 7,229,597 B2 | 6/2007 | Patchett et al. | |
| 7,251,929 B2 | 8/2007 | Hu et al. | |
| 7,306,642 B2 * | 12/2007 | Hayward et al. | 55/523 |
| 7,434,387 B2 | 10/2008 | Yan | |
| 7,485,270 B2 * | 2/2009 | Twigg et al. | 423/213.2 |
| 7,517,510 B2 * | 4/2009 | Chen et al. | 423/213.2 |
| 7,566,426 B2 * | 7/2009 | Zuberi | 422/180 |
| 7,614,214 B2 | 11/2009 | Yan | |
| 7,722,829 B2 * | 5/2010 | Punke et al. | 422/180 |
| 7,740,817 B2 * | 6/2010 | Matsumoto et al. | 423/213.2 |
| 7,740,819 B2 * | 6/2010 | Morita et al. | 423/247 |
| 7,744,670 B2 * | 6/2010 | Miao et al. | 55/523 |
| 7,749,472 B2 * | 7/2010 | Chen et al. | 423/213.2 |
| 7,776,786 B2 * | 8/2010 | DiFrancesco et al. | 502/439 |
| 7,807,110 B2 * | 10/2010 | DiFrancesco et al. | 422/180 |
| 7,833,495 B2 * | 11/2010 | Willey et al. | 422/180 |
| 2003/0021745 A1 | 1/2003 | Chen | |
| 2003/0100447 A1 | 5/2003 | Deeba et al. | |
| 2004/0198595 A1 | 10/2004 | Chen | |
| 2005/0031514 A1 * | 2/2005 | Patchett et al. | 423/239.2 |
| 2005/0239642 A1 * | 10/2005 | Kim et al. | 502/219 |
| 2006/0057046 A1 | 3/2006 | Punke et al. | 423/215.5 |
| 2006/0188416 A1 * | 8/2006 | Alward et al. | 422/180 |
| 2006/0270816 A1 * | 11/2006 | Tao et al. | 526/317.1 |
| 2007/0014705 A1 * | 1/2007 | Franklin Chen | 422/168 |
| 2007/0104623 A1 * | 5/2007 | Dettling et al. | 422/177 |
| 2007/0271888 A9 * | 11/2007 | Hayward et al. | 55/523 |
| 2008/0020922 A1 * | 1/2008 | Li et al. | 502/73 |
| 2008/0032090 A1 * | 2/2008 | Beall et al. | 428/116 |
| 2008/0038172 A1 * | 2/2008 | Chen et al. | 423/213.2 |
| 2008/0045405 A1 * | 2/2008 | Beutel et al. | 502/103 |
| 2008/0081761 A1 * | 4/2008 | Suzuki | 502/304 |
| 2008/0141661 A1 * | 6/2008 | Voss et al. | 60/295 |
| 2008/0256935 A1 * | 10/2008 | Oger et al. | 60/299 |
| 2009/0155134 A1 * | 6/2009 | Li | 422/177 |
| 2009/0155525 A1 * | 6/2009 | Li | 428/116 |
| 2010/0170230 A1 * | 7/2010 | Chiffey et al. | 60/297 |

FOREIGN PATENT DOCUMENTS

| | | |
|---|---|---|
| EP | 1121981 | 8/2001 |
| EP | 1308200 A | 5/2003 |
| EP | 1438135 A | 7/2004 |
| WO | WO-92/09848 | 6/1992 |
| WO | WO-9723278 | 3/1997 |
| WO | WO-99/55459 | 11/1999 |
| WO | WO-0174476 | 11/2001 |
| WO | 20080088649 A | 7/2008 |

OTHER PUBLICATIONS

Non-Final Office Action in U.S. Appl. No. 11/970,221, mailed Aug. 6, 2010, 22 pgs.

* cited by examiner

CSF WITH LOW PLATINUM/PALLADIUM RATIOS

BACKGROUND OF THE INVENTION

Embodiments of the present invention relate to components for an emission treatment system for removing pollutants from an exhaust stream. More particularly, the present invention relates to catalyzed soot filters for exhaust systems and methods of manufacturing the same.

Diesel engine exhaust is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of $NO_x$.

Oxidation catalysts that contain platinum group metals, base metals and combinations thereof are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts (DOC's), which are placed in the exhaust of diesel engines to treat the exhaust before it vents to the atmosphere. In addition to the conversions of gaseous HC, CO and particulate matter, oxidation catalysts that contain platinum group metals (which are typically dispersed on a refractory oxide support) also promote the oxidation of nitric oxide (NO) to $NO_2$. The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel. Small proportions of $SO_3$ are formed during combustion of the diesel, which in turn combines rapidly with water in the exhaust to form sulfuric acid. The sulfuric acid collects as a condensed phase with the particulates as an aerosol, or is adsorbed onto the other particulate components, and thereby adds to the mass of TPM.

One key aftertreatment technology in use for high particulate matter reduction is the diesel particulate filter. There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust. The filter is a physical structure for removing particles from exhaust, and the accumulating particles will increase the back pressure from the filter on the engine. Thus the accumulating particles have to be continuously or periodically burned out of the filter to maintain an acceptable back pressure. Unfortunately, the carbon soot particles require temperatures in excess of 500° C. to burn under oxygen rich (lean) exhaust conditions. This temperature is higher than what is typically present in diesel exhaust.

Provisions are generally introduced to lower the soot burning temperature in order to provide for passive regeneration of the filter. The presence of a catalyst promotes soot combustion, thereby regenerating the filters at temperatures accessible within the diesel engine's exhaust under realistic duty cycles. In this way a catalyzed soot filter (CSF) or catalyzed diesel particulate filter (CDPF) is effective in providing for >80% particulate matter reduction along with passive burning of the accumulating soot, and thereby promoting filter regeneration.

Future emissions standards adopted throughout the world will also address $NO_x$ reductions from diesel exhaust. A proven $NO_x$ abatement technology applied to stationary sources with lean exhaust conditions is Selective Catalytic Reduction (SCR). In this process, $NO_x$ is reduced with ammonia ($NH_3$) to nitrogen ($N_2$) over a catalyst typically composed of base metals. The technology is capable of $NO_x$ reduction greater than 90%, and thus it represents one of the best approaches for achieving aggressive $NO_x$ reduction goals. SCR is under development for mobile applications, with urea (typically present in an aqueous solution) as the source of ammonia. SCR provides efficient conversions of $NO_x$ as long as the exhaust temperature is within the active temperature range of the catalyst.

While separate substrates each containing catalysts to address discrete components of the exhaust can be provided in an exhaust system, use of fewer substrates is desirable to reduce the overall size of the system, to ease the assembly of the system, and to reduce the overall cost of the system. One approach to achieve this goal is to coat the soot filter with a catalyst composition effective for the conversion of $NO_x$ to innocuous components. With this approach, the catalyzed soot filter assumes two catalyst functions: removal of the particulate component of the exhaust stream and conversion of the $NO_x$ component of the exhaust stream to $N_2$.

Coated soot filters that can achieve $NO_x$ reduction goals require a sufficient loading of SCR catalyst composition on the soot filter. The gradual loss of the catalytic effectiveness of the compositions that occurs over time through exposure to certain deleterious components of the exhaust stream augments the need for higher catalyst loadings of the SCR catalyst composition. However, preparation of coated soot filters with higher catalyst loadings can lead to unacceptably high back pressure within the exhaust system. Coating techniques that allow higher catalyst loadings on the wall flow filter, yet still allow the filter to maintain flow characteristics that achieve acceptable back pressures are therefore desirable.

An additional aspect for consideration in coating the wall flow filter is the selection of the appropriate SCR catalyst composition. First, the catalyst composition must be durable so that it maintains its SCR catalytic activity even after prolonged exposure to higher temperatures that are characteristic of filter regeneration. For example, combustion of the soot fraction of the particulate matter often leads to temperatures above 700° C. Such temperatures render many commonly used SCR catalyst compositions such as mixed oxides of vanadium and titanium less catalytically effective. Second, the SCR catalyst compositions preferably have a wide enough operating temperature range so that they can accommodate the variable temperature ranges over which the vehicle operates. Temperatures below 300° C. are typically encountered, for example, at conditions of low load, or at startup. The SCR catalyst compositions are preferably capable of catalyzing the reduction of the $NO_x$ component of the exhaust to achieve $NO_x$ reduction goals, even at lower exhaust temperatures.

A significant driver to the development of diesel emission technologies is the relative rarity of the catalytic materials and the difficulty of manufacture. Most catalyzed soot filters are Pt/Pd based, with ratios typically between 4:1 and 2:1. By decreasing the percentage of platinum in the catalyst composition, the cost of the catalyst is reduced. However, platinum is more catalytically active than palladium or Pt/Pd formulations for CO and HC conversion. Therefore, there remains a need in the art for catalyst compositions with activity close to or greater than that of currently available platinum and Pt/Pd formulations.

SUMMARY OF THE INVENTION

Embodiments of the invention relate to catalyzed soot filters comprising a wall flow monolith. The wall flow monolith may have a plurality of longitudinally extending passages formed by longitudinally extending walls bounding and defining the passages. The passages comprise inlet passages having an open inlet end and closed outlet end, and outlet passages having a closed inlet end and an open outlet end. A washcoat may be disposed on the walls of the wall flow monolith. The washcoat includes first support particles and second support particles. A precious metal component comprising a mixture of platinum and palladium may be on the first support particles, and a precious metal component selected from substantially only palladium may be on the second support particles. In specific embodiments the precious metal component selected from substantially only palladium comprises less than about 10% platinum by weight. In other specific embodiments the precious metal component comprises less than about 5% platinum by weight or less than about 1% platinum by weight.

Detailed embodiments of the invention have the first support particles comprising about a 2:1 by weight mixture of platinum components to palladium components. The washcoat of other detailed embodiments has first and second support particles with an overall Pt:Pd ratio between about 1:4 and about 4:1, or between about 1:2 and about 2:1, or between about 1:2 and about 3:2, or between about 0.8:1 and about 1.2:1, or about 1:1, each of these ratios by weight.

The catalyzed soot filter of other embodiments has the first support particles and the second support particles being one or more of silicon on alumina, zirconia containing materials and zeolite. In some detailed embodiments, the first support particles and second support particles are comprised of different materials. Other detailed embodiments have the wall flow substrate made of one or more of silicon carbide, aluminum titanate and cordierite.

In a detailed embodiment, the catalyzed soot filter, after aging at 700° C. in 10% steam for four hours (hydrothermal aging), exhibits greater CO and hydrocarbon conversions then a catalyzed soot filter with about an equivalent Pt:Pd ratio prepared by conventional methods, when measured at temperatures between about 100° C. and about 190° C. when measured under the same conditions.

In another detailed embodiment, the soot filter, after hydrothermal aging followed by additional aging at 800° C. for four hours, exhibits greater CO conversion than a catalyzed soot filter having a Pt:Pd ratio of about 2:1 prepared according to conventional methods, when measured at temperatures between about 100° C. and about 170° C. when measured under the same conditions.

In a further detailed embodiment, the catalyzed soot filter, after hydrothermal aging followed by additional aging at 800° C. for four hours, exhibits greater CO conversion than a catalyzed soot filter having essentially Pt only prepared according to conventional methods, when measured at temperatures between about 100° C. and about 170° C. when measured under the same conditions.

Additional embodiments of the invention are directed toward methods of making a catalyzed soot filter. The method comprises applying at least a platinum component and a palladium component to first support particles. A precious metal component selected from only a palladium component is applied to second support particles. A slurry is prepared comprising the first support particles and the second support particles. A wall flow substrate with gas permeable walls formed into a plurality of axially extending channels is provided. Each channel has one end plugged with any pair of adjacent channels plugged at the opposite ends. The wall flow substrate is washcoated with the slurry.

Some embodiments include an organic acid having at least two acid groups in the slurry. The organic acid having more than one carboxylic acid group is selected from the group consisting of tartaric acid, citric acid, n-acetylglutamic acid, adipic acid, alpha-ketoglutaric acid, aspartic acid, azelaic acid, camphoric acid, carboxyglutamic acid, citric acid, dicrotalic acid, dimercaptosuccinic acid, fumaric acid, glutaconic acid, glutamic acid, glutaric acid, isophthalic acid, itaconic acid, maleic acid, malic acid, malonic acid, mesaconic acid, mesoxalic acid, 3-methylglutaconic acid, oxalic acid, oxaloacetic acid, phthalic acid, phthalic acids, pimelic acid, sebacic acid, suberic acid, succinic acid, tartronic acid, terephthalic acid, traumatic acid, trimesic acid, carboxyglutamate, derivatives thereof and combinations thereof.

A catalyzed soot filter of other embodiments comprises a wall flow substrate made from an aluminum titanate, cordierite, silicon carbide or combination material. The catalyzed soot filter has a washcoat of catalytic material adapted to convert hydrocarbons and CO applied directly to the wall flow substrate without a passivation layer between the substrate and the washcoat. The washcoat comprises a mixture of first support particles coated with a 2:1 Pt:Pd mixture and second support particles coated with essentially only Pd. The mixture of first and second support particles results in a Pt:Pd ratio about 1:1. The wall flow substrate has gas permeable walls formed into a plurality of axially extending channels. Each channel has one end plugged with any pair of adjacent channels plugged at opposite ends thereof. Where upon hydrothermal aging of the wall flow substrate containing the washcoat followed by additional aging at 800° C. for four hours, the catalyzed soot filter exhibits hydrocarbon and CO conversions that are greater at temperatures in the range of about 100° C. to about 170° C. than the hydrocarbon and CO conversions of a catalyzed soot filter but made with essentially Pt only and a passivation layer between the substrate and the washcoat when measured under the same conditions.

DETAILED DESCRIPTION OF THE INVENTION

Before describing several exemplary embodiments of the invention, it is to be understood that the invention is not limited to the details of construction or process steps set forth in the following description. The invention is capable of other embodiments and of being practiced or being carried out in various ways.

As used in this specification and the appended claims, the singular forms "a", "an" and "the" include plural referents unless the context clearly indicates otherwise. Thus, for example, reference to "an acid" includes a mixture of two or more acids, and the like.

As used in this specification and the appended claims, the term "hydrothermal aging" means aging at 700° C. in 10% steam for four hours.

Embodiments of the invention relate to a process for making catalyzed soot filters for use as part of an emission treatment system. The purpose of an emission treatment system is to provide simultaneous treatment of the particulate matter, $NO_x$ and other gaseous components of diesel engine exhaust. The emission treatment system uses an integrated soot filter and selective catalytic reduction (SCR) catalyst to significantly minimize the weight and volume required for the emissions system. Moreover, due to the choice of catalytic compositions implemented in the system, effective pollutant abatement is provided for exhaust streams of varying temperatures. This feature is advantageous for operating diesel vehicles under varying loads and vehicle speeds which significantly impact exhaust temperatures emitted from the engines of such vehicles.

Catalyzed soot filters made by the conventional coating process have some drawbacks. These drawbacks include, but are not limited to, the need for expensive precious metals, insufficient gas activity and the need to passivate many substrates prior to washcoating.

According to one or more embodiments, a method for applying a catalyst composition to a soot filter is provided such that the filter has physical properties superior to conventional filters, including methods for making a soot filter without requiring a polymer passivation step during manufacture.

Figure 1:
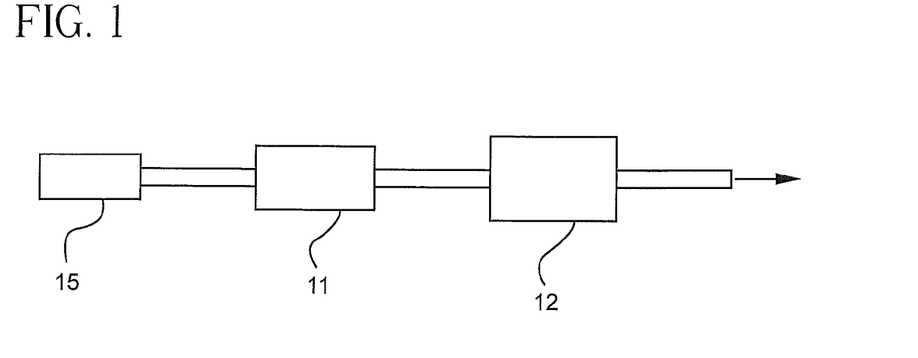
FIG. 1 shows a schematic depiction of an embodiment of the emission treatment system of the invention.

One embodiment of an emission treatment system is schematically depicted in FIG. 1. As can be seen in FIG. 1, the exhaust containing gaseous pollutants (including unburned hydrocarbons, carbon monoxide and $NO_x$) and particulate matter is conveyed from the engine 15 to an oxidation catalyst 11. In the oxidation catalyst 11, unburned gaseous and non-volatile hydrocarbons (i.e., the VOF) and carbon monoxide are largely combusted to form carbon dioxide and water. Removal of substantial proportions of the VOF using the oxidation catalyst, in particular, helps prevent too great a deposition of particulate matter on the soot filter 12 (i.e., clogging), which is positioned downstream in the system. In addition, a substantial proportion of the NO of the $NO_x$ component is oxidized to $NO_2$ in the oxidation catalyst.

The exhaust stream is conveyed to the soot filter 12 which is coated with a catalyst composition. According to one or more embodiments, the particulate matter including the soot fraction and the VOF are also largely removed (greater than 80%) by the soot filter. The particulate matter deposited on the soot filter is combusted through the regeneration of the filter. The temperature at which the soot fraction of the particulate matter combusts is lowered by the presence of the catalyst composition disposed on the soot filter. The catalyzed soot filter 12 may optionally contain an SCR catalyst for converting the $NO_x$ in the exhaust gas stream to nitrogen.

Wall flow substrates useful for supporting the catalyst compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain greater than about 300 cell per square inch, and up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Preferred wall flow substrates have a wall thickness of between 0.002 and 0.015 inches.

Figure 2:
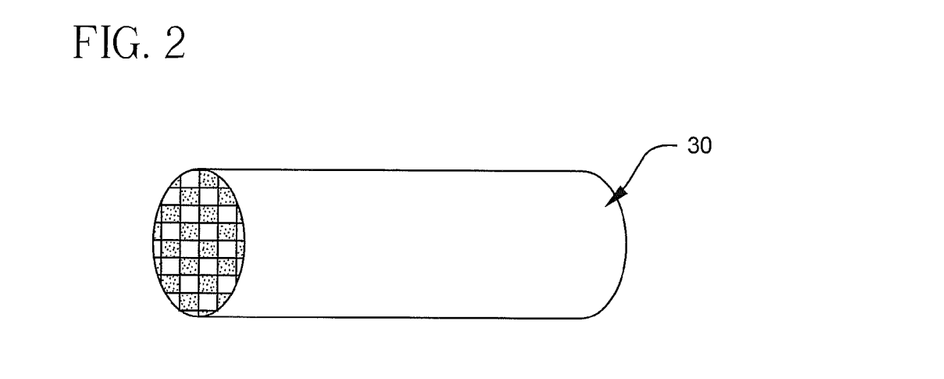
FIG. 2 shows a perspective view of a wall flow filter substrate.
Figure 3:
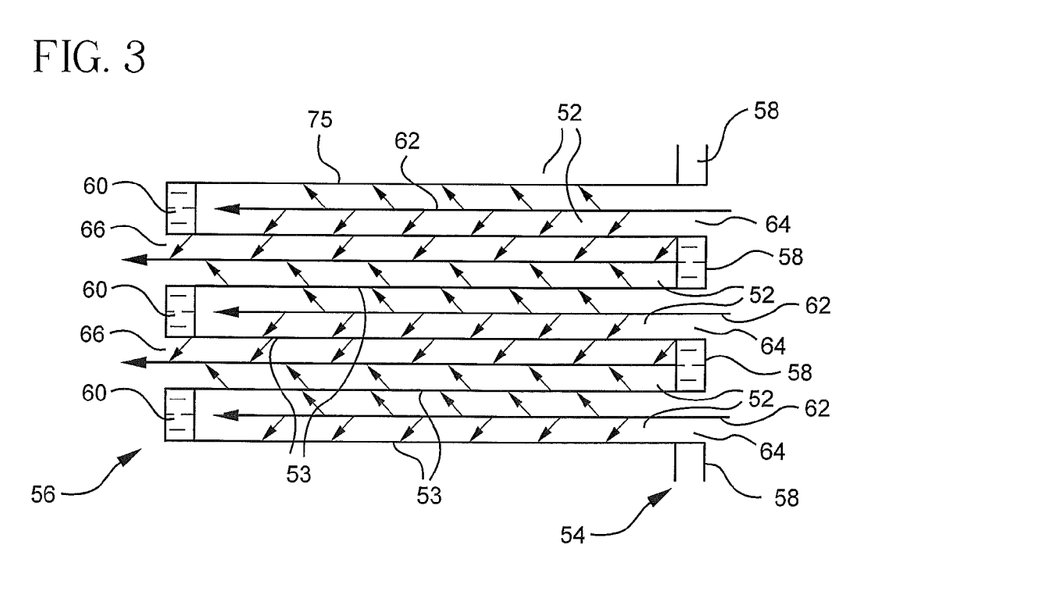
FIG. 3 shows a cutaway view of a section of a wall flow filter substrate.

FIGS. 2 and 3 illustrate a wall flow filter substrate 30 which has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

Wall flow filter substrates are composed of ceramic-like materials, including but not limited to, cordierite, α-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. The wall flow monolith of other embodiments is one or more of aluminum titanate, cordierite, metal oxides and ceramics.

Accordingly, one or more embodiments of the invention relate to catalyzed soot filters comprising a wall flow monolith. The wall flow monolith may have a plurality of longitudinally extending passages formed by longitudinally extending walls bounding and defining the passages. The passages comprise inlet passages having an open inlet end and closed outlet end, and outlet passages having a closed inlet end and an open outlet end. A washcoat may be disposed on the walls of the wall flow monolith. The washcoat includes first support particles and second support particles. A precious metal component comprising a mixture of platinum and palladium may be on the first support particles, and a precious metal component selected from substantially only palladium may be on the second support particles. Substantially only palladium refers to a precious metal loading that comprises less than about 10% platinum. In specific embodiments, substantially only palladium refers to a precious metal loading that comprises less than about 5% platinum, or less than about 1% platinum loading.

Detailed embodiments of the invention have the first support particles comprising about a 2:1 mixture of platinum components to palladium components. The washcoat of other detailed embodiments has first and second support particles with an overall Pt:Pd ratio between about 1:4 and about 4:1, or between about 1:2 and about 2:1, or between about 1:2 and about 3:2; between about 0.8:1 and about 1.2:1; or about 1:1.

The catalyzed soot filter of other embodiments has the first support particles and the second support particles being one or more of silicon on alumina, zirconia containing materials and zeolite. In some detailed embodiments, the first support particles and second support particles are comprised of different materials. Other embodiments have a wall flow substrate made of one or more of silicon carbide, aluminum titanate and cordierite.

In a detailed embodiment, the catalyzed soot filter, after hydrothermal aging, exhibits greater CO and hydrocarbon conversions then a catalyzed soot filter with about an equivalent Pt:Pd ratio prepared by conventional methods, when measured at temperatures between about 100° C. and about 190° C. when measured under the same conditions.

In another detailed embodiment, the soot filter, after hydrothermal aging followed by additional aging at 800° C. for four hours, exhibits greater CO conversion than a catalyzed soot filter having a Pt:Pd ratio of about 2:1 prepared according to conventional methods, when measured at temperatures between about 100° C. and about 170° C. when measured under the same conditions.

In a further detailed embodiment, the catalyzed soot filter, after hydrothermal aging followed by additional aging at 800° C. for four hours, exhibits greater CO conversion than a catalyzed soot filter having essentially only platinum compounds prepared according to conventional methods, when measured at temperatures between about 100° C. and about 170° C. when measured under the same conditions.

Additional embodiments of the invention are directed toward methods of making a catalyzed soot filter. The method comprises applying at least a platinum component and a palladium component to first support particles. A precious metal component selected from only a palladium component is applied to second support particles. A slurry is prepared comprising the first support particles and the second support particles. A wall flow substrate with gas permeable walls formed into a plurality of axially extending channels is provided. Each channel has one end plugged with any pair of adjacent channels plugged at the opposite ends. The wall flow substrate is washcoated with the slurry.

Some embodiments include an organic acid having at least two acid groups in the slurry. Suitable acids include, but are not limited to, n-acetylglutamic acid ((2S)-2-acetamidopentanedioic acid), adipic acid (hexanedioic acid), aldaric acid, alpha-ketoglutaric acid (2-oxopentanedioic acid), aspartic acid ((2S)-2-aminobutanedioic acid), azelaic acid (nonanedioic acid), camphoric acid ((1R,3S)-1,2,2-trimethylcyclopentane-1,3-dicarboxylic acid), carboxyglutamic acid (3-aminopropane-1,1,3-tricarboxylic acid), citric acid (2-hydroxypropane-1,2,3-tricarboxylic acid), creatine-alpha ketoglutarate, dicrotalic acid (3-hydroxy-3-methylpentanedioic acid), dimercaptosuccinic acid (2,3-bis-sulfanylbutanedioic acid), fumaric acid (trans-butenedioic acid), glutaconic acid (pent-2-enedioic acid), glutamic acid ((2S)-2-aminopentanedioic acid), glutaric acid (pentanedioic acid), isophthalic acid (benzene-1,3-dicarboxylic acid m-phthalic acid), itaconic acid (2-methylidenebutanedioic acid), maleic acid (cis-butenedioic acid), malic acid (hydroxybutanedioic acid), malonic acid (propanedioic acid), mesaconic acid ((2E)-2-methyl-2-butenedioic acid), mesoxalic acid (2-oxopropanedioic acid), 3-methylglutaconic acid ((2E)-3-methylpent-2-enedioic acid), oxalic acid (ethanedioic acid), oxaloacetic acid (3-carboxy-3-oxopropanoic acid), phthalic acid (benzene-1,2-dicarboxylic acid o-phthalic acid), phthalic acids (mixture of the ortho, meta and para benzene dicarboxylic phthalic acids), pimelic acid (heptanedioic acid), sebacic acid (decanedioic acid), suberic acid (octanedioic acid), succinic acid (butanedioic acid), tartaric acid (2,3-dihydroxybutanedioic acid), tartronic acid (2-hydroxypropanedioic acid), terephthalic acid (benzene-1,4-dicarboxylic acid p-phthalic acid), traumatic acid (dodec-2-enedioic acid), trimesic acid (benzene-1,3,5-tricarboxylic acid), derivatives thereof and combinations thereof. In a detailed embodiment, the acid is tartaric acid.

A catalyzed soot filter of other embodiments comprises a wall flow substrate made from an aluminum titanate, cordierite, silicon carbide or combination material. The catalyzed soot filter has a washcoat of catalytic material adapted to convert hydrocarbons and CO applied directly to the wall flow substrate without a passivation layer between the substrate and the washcoat. The washcoat comprises a mixture of first support particles coated with a 2:1 Pt:Pd mixture and second support particles coated with essentially only Pd. The mixture of first and second support particles results in a Pt:Pd ratio about 1:1. The wall flow substrate has gas permeable walls formed into a plurality of axially extending channels. Each channel has one end plugged with any pair of adjacent channels plugged at opposite ends thereof. Upon hydrothermal aging of the wall flow substrate containing the washcoat followed by additional aging at 800° C. for four hours, the catalyzed soot filter exhibits hydrocarbon and CO conversions that are greater at temperatures in the range of about 100° C. to about 170° C. than the hydrocarbon and CO conversions of a catalyzed soot filter but made with essentially Pt only and a passivation layer between the substrate and the washcoat when measured under the same conditions. Under the same conditions means the samples were prepared on the same type of substrate, at the same loading, under the same feed gas conditions and space velocity.

EXAMPLES

TABLE 1

| Sample | Pt/Pd | Support Type | Acid in Slurry |
| --- | --- | --- | --- |
| Comparative A | 1:0 | Homogeneous | None |
| Comparative B | 2:1 | Homogeneous | None |
| Comparative C | 1:1 | Homogeneous | None |
| D | 1:1 | Segregated | None |
| E | 1:1 | Segregated | Tartaric |

Sample A

The substrate was a SiC wall-flow substrate with a porosity of 51%, mean pore size (MPS) of 22 μm, a cell density of 300/in$^2$ and a wall thickness of 12 mil. The filter substrate is a square segment having a dimension of 34 mm×34 mm×150 mm.

Sample A has a composition of 70 g/ft$^3$ Pt, 0.6 g/in$^3$ Si/Al$_2$O$_3$ (1.5% SiO$_2$), and 0.1 g/in$^3$ H-Beta zeolite. The total washcoat loading was 0.74 g/in$^3$.

Platinum monoethanolamine hydroxide solution was impregnated onto the Si—$Al_2O_3$ powder using the incipient wetness technique with a Planetary mixer. After impregnation, acetic acid (7% of the solid by weight) was added into the powder with stirring.

The Pt containing powder was then milled in a continuous mill to reduce the particle size to $D_{90}$<5 micron (90% of the particles less than 5 micron). H-Beta was then added to the mill, and the mixture was further milled to reach a particle size of $D_{90}$<4 micron. The slurry was diluted to a solid content of 24% before coating.

The resulting slurry was washcoated by immersing the substrate into the slurry with the inlet side of the substrate down and the outlet side just above (about ¼ inch) the slurry level. The substrate was pulled out of the slurry, and a stream of air was blown from the outlet side until there was no washcoat slurry coming out of the substrate. The coated sample was then dried at 110° C. for 2 hours and calcined in air at 450° C. for 1 hour.

Sample B

This catalyst had the following composition: 46.67 g/ft³ Pt, 23.33 g/ft³ Pd, 0.6 g/in³ Si-alumina (1.5% $SiO_2$ on $Al_2O_3$), 0.1 g/in³ Beta zeolite. The total washcoat loading was 0.74 g/in³.

To prepare the catalyst coating slurry, a Pt tetra monoethanolamine hydroxide solution was impregnated onto the Si/alumina powder via the incipient wetness technique in a Planetary mixer. Then, Pd nitrate was applied to the Pt/Si-alumina powder using the same impregnation technique. The precious metal impregnated powder was then dispersed into water to make a slurry. This slurry was milled using a continuous mill to reduce the particle size to 90% less than 5 micrometer ($D_{90}$<5 µm). H-Beta was then added to the mill, and the mixture was further milled to reach a particle size of $D_{90}$<4 micron. The slurry was diluted to a solid content of 23% before coating.

The substrate was immersed into the slurry with inlet side of the substrate down and the outlet side just above (about ¼ inch) the slurry level. The substrate was pulled out of the slurry, and a stream of air was blown from the outlet side until there was no washcoat slurry coming out of the substrate. The coated sample was then dried at 110° C. for 2 hours and calcined in air at 450° C. for 1 hour.

Sample C

This catalyst had the following composition: 35 g/ft³ Pt, 35/ft³ Pd, 0.6 g/in³ Si-alumina (1.5% $SiO_2$ on $Al_2O_3$), 0.1 g/in³ Beta zeolite. The total washcoat loading was 0.74 g/in³.

A Pt tetra monoethanolamine hydroxide solution was impregnated onto the Si-alumina powder via the incipient wetness technique in a Planetary mixer. Then, Pd nitrate was applied on the Pt/Si-alumina powder using the same impregnation technique. The precious metal impregnated powder was then dispersed into water to make a slurry. This slurry was milled using a continuous mill to reduce the particle size to 90% less than 5 micrometer ($D_{90}$<5 µm). H-Beta was then added to the mill, and the mixture was further milled to reach a particle size of $D_{90}$<4 micron. The slurry was diluted to a solid content of 23% before coating.

The substrate was immersed into the slurry with inlet side of the substrate down and the outlet side just above (about ¼ inch) the slurry level. The substrate was pulled out of the slurry, and a stream of air was blown from the outlet side until there was no washcoat slurry coming out of the substrate. The coated sample was then dried at 110° C. for 2 hours and calcined in air at 450° C. for 1 hour.

Sample D

This catalyst had the following composition: 35 g/ft³ Pt, 35/ft³ Pd, 0.6 g/in³ Si-alumina (1.5% $SiO_2$ on $Al_2O_3$), 0.1 g/in³ Beta zeolite. The total washcoat loading was 0.74 g/in³.

A Pt tetra monoethanolamine hydroxide solution was impregnated onto one half of the total Si-alumina powder (equivalent to 0.3 g/in³) via the incipient wetness technique in a Planetary mixer. Then, one half of the Pd nitrate (equivalent to 17.5 g/ft³) was applied on the Pt/Si-alumina powder using the same impregnation technique.

The other half quantity of Pd (17.5 g/ft³) was applied to the other half of the Si-alumina (0.3 g/in³) using the incipient wetness technique.

The two powders were mixed and put into a continuous mill reduce the particle size to 90% less than 5 micrometer ($D_{90}$<5 µm). H-Beta was then added to the mill, and the mixture was further milled to reach a particle size of $D_{90}$<4 micron. The slurry was diluted to a solid content of 21% before coating.

Sample E

This catalyst had the following composition: 35 g/ft³ Pt, 35/ft³ Pd, 0.6 g/in³ Si-alumina (1.5% $SiO_2$ on $Al_2O_3$), 0.1 g/in³ Beta zeolite. The total washcoat loading was 0.74 g/in³.

A Pt tetra monoethanolamine hydroxide solution was impregnated onto one half of the total Si-alumina powder (equivalent to 0.3 g/in³) via the incipient wetness technique in a Planetary mixer. Then, one half of the Pd nitrate (equivalent to 17.5 g/ft³) was applied to the Pt/Si-alumina powder using the same impregnation technique. This Pt/Pd/Si-alumina powder was calcined at 450° C. for 2 hours.

The other half quantity of Pd (17.5 g/ft³) was applied to the other half of the Si-alumina (0.3 g/in³) using the incipient wetness technique. This Pd/Si-alumina powder was calcined at 450° C. for 2 hours.

The two calcined powders were mixed and put into a continuous mill to reduce the particle size to 90% less than 5 micrometer ($D_{90}$<5 µm). During milling, tartaric acid was added to the mill to reach pH=4-5. H-Beta was then added to the mill, and the mixture was further milled to reach a particle size of $D_{90}$<4 micron. The slurry was diluted to a solid content of 21% before coating.

Catalyst Test Conditions

The catalyzed soot filter samples were tested in a flow reactor system with a feed containing 1000 ppm CO, 450 ppm hydrocarbons on a C1 basis, 100 ppm NO, 10% $O_2$, 7% water, 5% $CO_2$ with the balance made up with $N_2$. The hydrocarbon makeup was equal portions of propene, toluene and decane, all on C1 basis. The space velocity for the test was 35,000 h⁻¹. The system was equipped with CO, HC, $CO_2$ analyzers as well as a FTIR spectrometer and a mass spectrometer, which were used to determine the conversion efficiency of a catalyst. A catalyst was first saturated with the feed at 90° C. After 90 seconds of stabilization at 90° C., the temperature was ramped to 300° C. at 20° C./minute. The concentrations of reactants and products were continuously monitored and recorded. The conversions of CO and total hydrocarbons (THC) at various times were calculated as a relative difference between the concentration in feed (without passing the catalyst) and the resulting concentration after passing through the catalyst. Before testing, the samples were aged in an apparatus at 700° C. for four hours with flowing air and 10% steam. Samples were then aged in an apparatus at 800° C. for an additional four hours.

Figure 4:
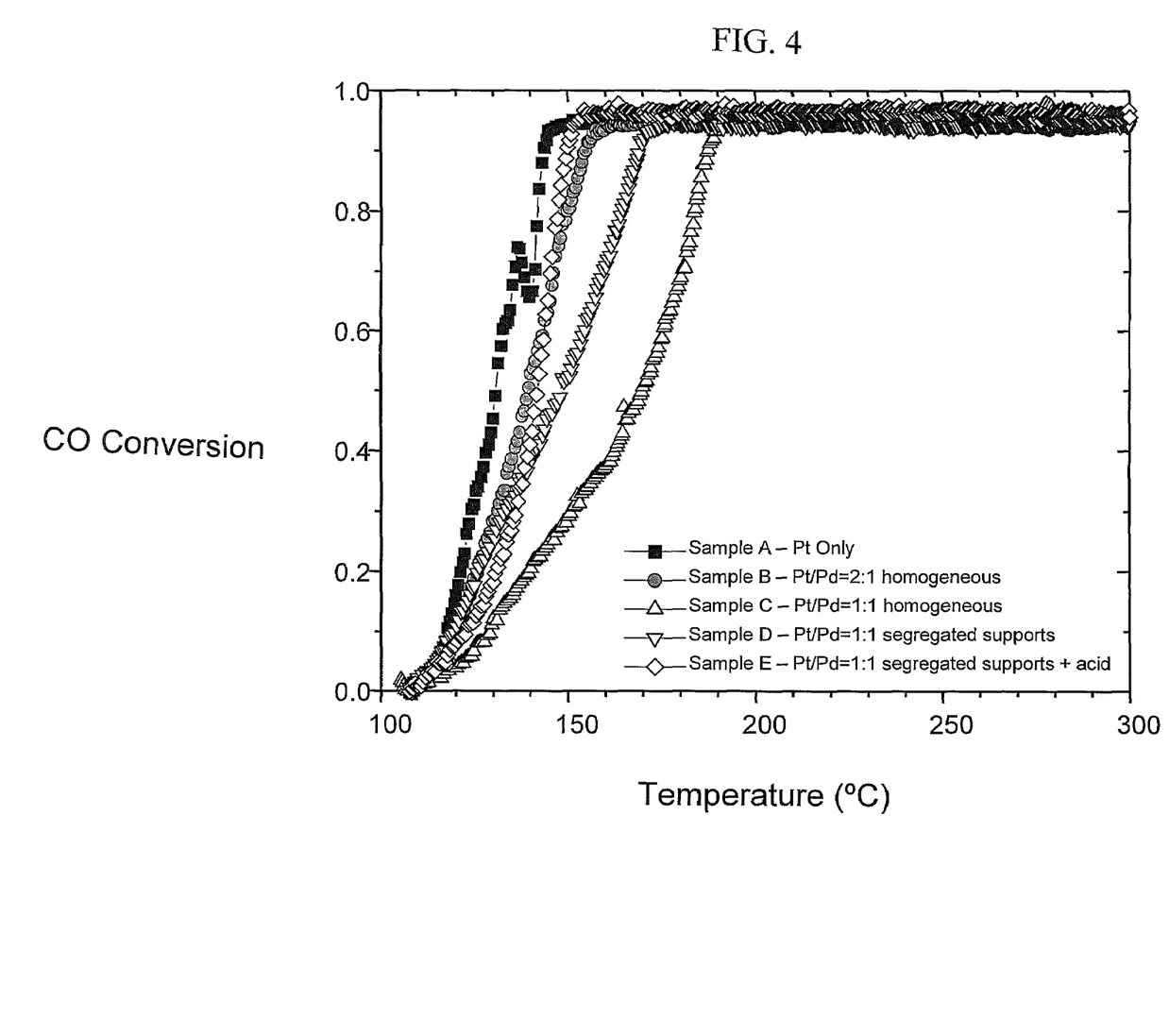
FIG. 4 shows a comparison of the CO conversions between Samples A through E after aging at 700° C. for four hours.

FIG. 4 shows the CO conversion of Samples A through E after hydrothermal aging. All of the samples have a greater conversion efficiency and lower light-off temperature than Sample C which is a simple 1:1 Pt:Pd homogeneous mixture. Sample E having equal amounts of platinum and palladium made with tartaric acid in the slurry shows comparable activity to the homogeneous 2:1 Pt:Pd Sample B. Sample E made through the tartaric acid process light-off CO at lower temperatures ($T_{50}$≈140° C.) than Sample D ($T_{50}$≈150° C.) made without tartaric acid. [$T_{50}$ is the light-off temperature or the temperature at 50% conversion.]

Figure 5:
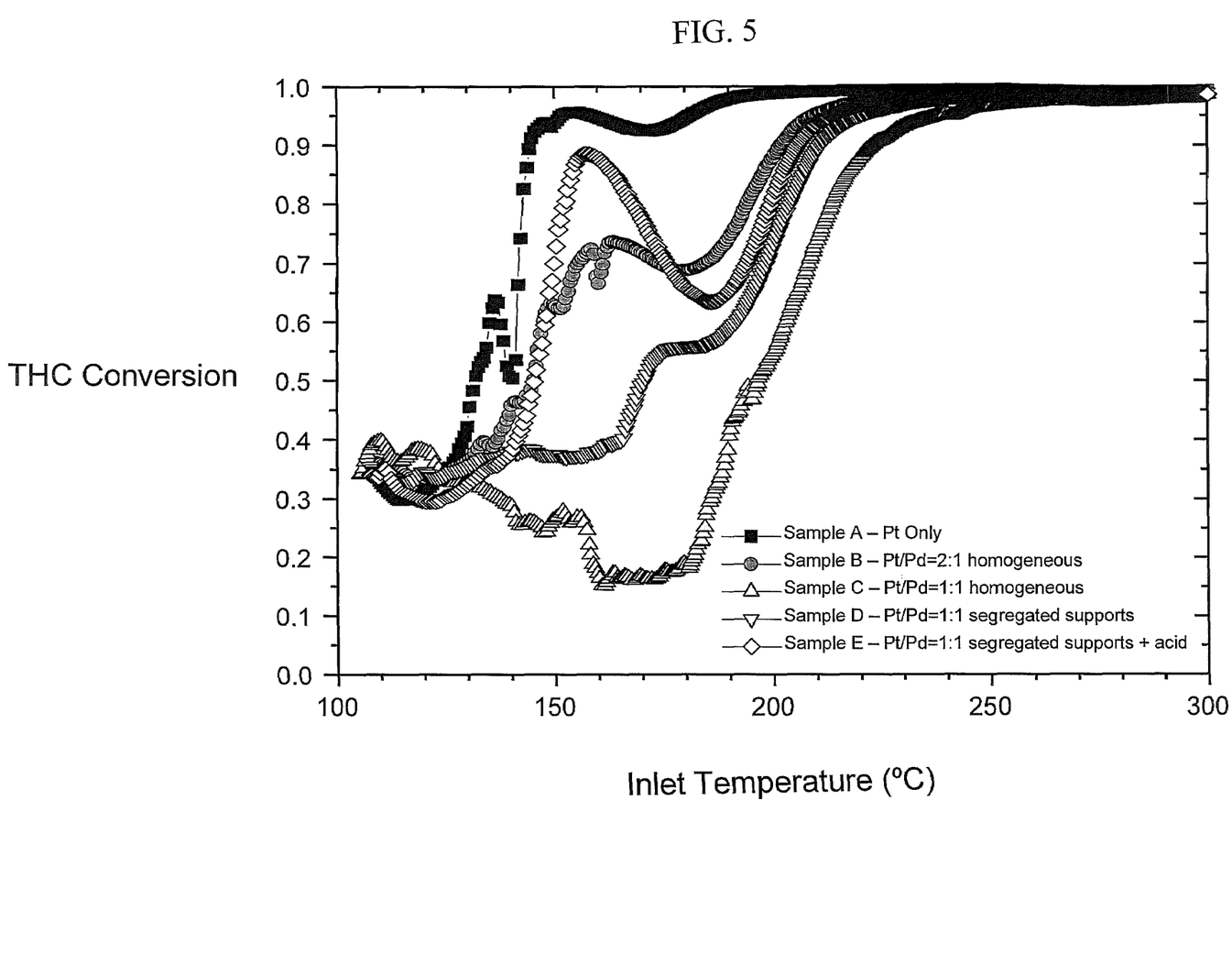
FIG. 5 shows a comparison of the total hydrocarbon conversion between Samples A through E after aging at 700° C. for four hours.

FIG. 5 shows that both segregated support Sample D and Sample E have much lower HC conversion than the homogeneous support Sample C when hydrothermally aged. Additionally, Sample E, prepared with tartaric acid, has an equivalent light-off temperature as the homogeneous support sample having a Pt:Pd ratio of 2:1.

Figure 6:
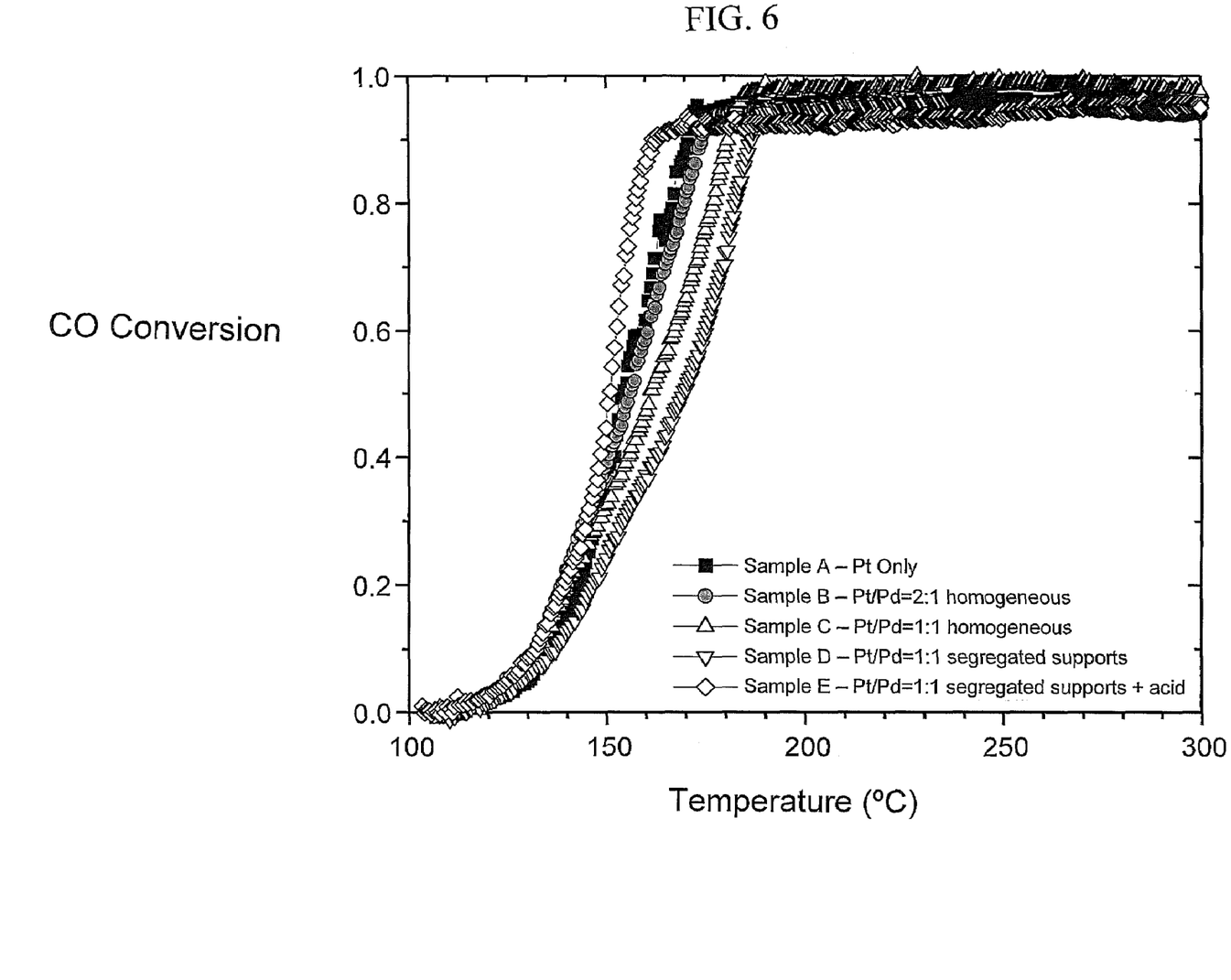
FIG. 6 shows a comparison of the CO conversion among Samples A through E after aging at 700° C. for four hours followed by aging at 800° C. for four hours.

FIG. 6 shows the CO conversion of Samples A through E after hydrothermal aging followed by additional aging at 800° C. for four hours. Sample E prepared with tartaric acid shows a lower light-off temperature than the Pt only Sample A.

Figure 7:
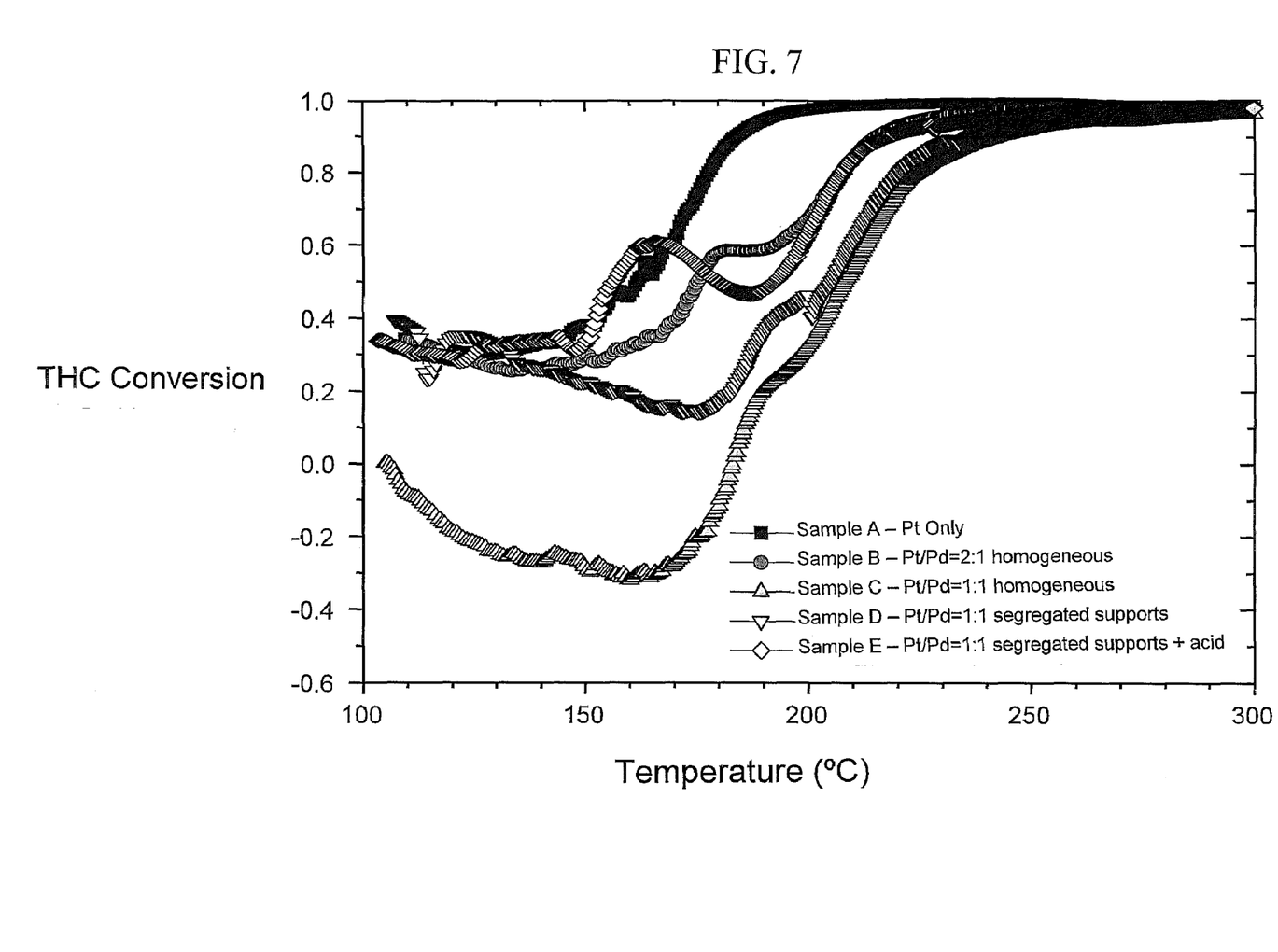
FIG. 7 shows a comparison of the total hydrocarbon conversion among Samples A through E after aging at 700° C. for four hours followed by aging at 800° C. for four hours.

FIG. 7 shows the hydrocarbon conversion of Sample A through Sample E. All of the samples have a lower light-off temperature than the homogeneous 1:1 Pt:Pd Sample C.

Accordingly, while the present invention has been disclosed in connection with various embodiments thereof, it should be understood that other embodiments might fall within the spirit and scope of the invention, as defined by the following claims.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalyzed soot filter comprising:
   a wall flow monolith having a plurality of longitudinally extending passages formed by longitudinally extending walls bounding and defining said passages, the passages comprising inlet passages having an open inlet end and closed outlet end, and outlet passages having a closed inlet end and an open outlet end; and
   a washcoat disposed on the walls of the wall flow monolith, the washcoat including first support particles and second support particles, a precious metal component comprising a mixture of platinum and palladium on the first support particles, and a precious metal component selected from substantially only palladium on the second support particles.

2. The catalyzed soot filter of claim 1, wherein the substantially only palladium precious metal component comprises less than about 10% platinum by weight.

3. The catalyzed soot filter of claim 1, wherein the substantially only palladium precious metal component comprises less than about 5% platinum by weight.

4. The catalyzed soot filter of claim 1, wherein the first support has a ratio of the platinum component to the palladium component of about 2:1 by weight.

5. The catalyzed soot filter of claim 1, wherein the washcoat containing first and second support particles has a Pt:Pd ratio between about 1:4 and about 4:1 by weight.

6. The catalyzed soot filter of claim 1, wherein the washcoat containing first and second support particles has a Pt:Pd ratio between about 1:2 and about 2:1 by weight.

7. The catalyzed soot filter of claim 1, wherein the washcoat containing first and second support particles has a Pt:Pd ratio of about 1:1 by weight.

8. The catalyzed soot filter of claim 7, wherein the soot filter, after hydrothermal aging, exhibits greater CO and hydrocarbon conversions than a catalyzed soot filter with about an equivalent Pt:Pd ratio prepared by conventional methods, when measured at temperatures between about 100° C. and about 190° C. when measured under the same conditions.

9. The catalyzed soot filter of claim 7, wherein the soot filter, after hydrothermal aging followed by additional aging at 800° C. for four hours, exhibits greater CO conversion than a catalyzed soot filter having a Pt:Pd ratio of about 2:1 prepared according to conventional methods, when measured at temperatures between about 100° C. and about 170° C. when measured under the same conditions.

10. The catalyzed soot filter of claim 7, wherein the soot filter, after hydrothermal aging followed by additional aging at 800° C. for four hours, exhibits greater CO conversion than a catalyzed soot filter having essentially Pt only prepared according to conventional methods, when measured at temperatures between about 100° C. and about 170° C. when measured under the same conditions.

11. The catalyzed soot filter of claim 1, wherein the first support particles and second support particles are selected from the group consisting of silicon on alumina, alumina, zirconia containing materials, ceria containing materials, titania, zeolite and combinations thereof.

12. The catalyzed soot filter of claim 11, wherein the first support particles and the second support particles are comprised of different materials.

13. The catalyzed soot filter of claim 1, wherein the wall flow substrate is made of a material selected from the group consisting of silicon carbide, aluminum titanate, cordierite, alumina and combinations thereof.

14. A catalyzed soot filter comprising a wall flow substrate made from an aluminum titanate, cordierite, silicon carbide or combination material having a washcoat of catalytic material adapted to convert hydrocarbons and CO applied directly to the wall flow substrate without a passivation layer between the substrate and the washcoat, the washcoat comprising a mixture of first support particles coated with a 2:1 Pt:Pd by weight mixture and second support particles coated with essentially only Pd, the mixture resulting in a Pt:Pd ratio about 1:1 by weight, the wall flow substrate having gas permeable walls formed into a plurality of axially extending channels, each channel having one end plugged with any pair of adjacent channels plugged at opposite ends thereof, wherein upon hydrothermal aging of the wall flow substrate containing the washcoat followed by additional aging at 800° C. for four hours, the catalyzed soot filter exhibits hydrocarbon and CO conversions that are greater at temperatures in the range of about 100° C. to about 170° C. than the hydrocarbon and CO conversions of a catalyzed soot filter but made with essentially Pt only and a passivation layer between the substrate and the washcoat when measured under the same conditions.

* * * * *